(12) United States Patent
Qi et al.

(10) Patent No.: US 11,505,764 B2
(45) Date of Patent: Nov. 22, 2022

(54) CONTINUOUS DISTILLATION PROCESS

(71) Applicant: CHENGUANG BIOTECH GROUP CO., LTD., Handan (CN)

(72) Inventors: Lijun Qi, Handan (CN); Shaowei Han, Handan (CN); Shaodong Ji, Handan (CN); Fengfei Li, Handan (CN); Wenjiang Yang, Handan (CN); Haijun Bao, Handan (CN)

(73) Assignee: CHENGUANG BIOTECH GROUP CO., LTD

( * ) Notice: Subject to any disclaimer, the term of this patent is extended or adjusted under 35 U.S.C. 154(b) by 310 days.

(21) Appl. No.: 16/651,770

(22) PCT Filed: Sep. 27, 2018

(86) PCT No.: PCT/CN2018/107972
§ 371 (c)(1),
(2) Date: Mar. 27, 2020

(87) PCT Pub. No.: WO2019/062816
PCT Pub. Date: Apr. 4, 2019

(65) Prior Publication Data
US 2020/0255765 A1    Aug. 13, 2020

(30) Foreign Application Priority Data

Sep. 29, 2017  (CN) .......................... 201710906633.2

(51) Int. Cl.
*B01D 3/30*  (2006.01)
*C11B 9/02*  (2006.01)
(Continued)

(52) U.S. Cl.
CPC .............. *C11B 9/027* (2013.01); *B01D 3/002* (2013.01); *B01D 3/30* (2013.01); *B01D 3/38* (2013.01); *B01D 5/006* (2013.01)

(58) Field of Classification Search
CPC . B01D 3/002; B01D 3/30; B01D 3/38; B01D 5/006; C11B 9/027
See application file for complete search history.

(56) References Cited

U.S. PATENT DOCUMENTS 4,257,945 A * 3/1981 Martel .................... C11B 9/025
426/651
4,406,745 A * 9/1983 Martel .................... C11B 9/027
202/175
(Continued)

FOREIGN PATENT DOCUMENTS

CN      101721831 A    6/2010
CN      201713348 U    1/2011
(Continued)

OTHER PUBLICATIONS

International Search Report for corresponding International application No. PCT/CN2018/107972; dated Nov. 15, 2018; 3 pages (Machine Translation).

*Primary Examiner* — Jonathan Miller
(74) *Attorney, Agent, or Firm* — Mendelsohn Dunleavy, P.C.

(57) ABSTRACT

A continuous distillation process comprises the following steps: putting a material into a multilayer distillation tower to enable the material to sequentially undergo preheating, extrusion pricking, steam distillation, meal roasting, drying and cooling treatment, condensing essential oil-containing steam, and carrying out water separation, so as to obtain an essential oil.

7 Claims, 3 Drawing Sheets

(51) Int. Cl.
  *B01D 3/00* (2006.01)
  *B01D 3/38* (2006.01)
  *B01D 5/00* (2006.01)

(56) References Cited

U.S. PATENT DOCUMENTS

| | | | | |
|---|---|---|---|---|
| 5,024,820 | A | * | 6/1991 | Coutiere .................. C11B 1/10 512/5 |
| 5,516,923 | A | * | 5/1996 | Hebert ................. B01D 35/153 554/20 |
| 5,582,694 | A | * | 12/1996 | McClelland .......... A23L 27/115 426/651 |
| 8,450,092 | B1 | * | 5/2013 | McClune ............... A01D 43/00 127/43 |
| 9,956,501 | B2 | * | 5/2018 | Balass ...................... A23L 2/52 |
| 10,441,896 | B2 | * | 10/2019 | Naito ........................ B01D 3/10 |
| 2008/0128261 | A1 | * | 6/2008 | Balass ................ B01D 11/0219 202/176 |
| 2010/0119606 | A1 | * | 5/2010 | Whittle ................... A61K 31/05 424/484 |
| 2014/0001027 | A1 | * | 1/2014 | Balass ...................... C12H 6/02 203/1 |

FOREIGN PATENT DOCUMENTS

| | | |
|---|---|---|
| CN | 103113980 A | 5/2013 |
| CN | 103977587 A | 8/2014 |
| CN | 205323257 U | 6/2016 |
| CN | 106867673 A | 6/2017 |
| CN | 106906048 A | 6/2017 |
| CN | 107699353 A | 2/2018 |
| CN | 207356609 U | 5/2018 |

\* cited by examiner

CONTINUOUS DISTILLATION PROCESS

TECHNICAL FIELD

The present invention relates to a method for producing a volatile essential oil, in particular to a continuous distillation process suitable for heat-sensitive materials such as prickly ash, pepper, *eucalyptus* leaves, cinnamon leaves, and fir.

BACKGROUND ART

Prickly ash, pepper, *eucalyptus* leaves, cinnamon leaves, fir and the like contain a large amount of volatile essential oil, which is an important natural plant extract, and plays an important role in the fields of food, cosmetics and the like.

At present, the volatile essential oil is generally extracted using a steam distillation process. The traditional steam distillation process generally uses tank group-type production, has small processing capacity, long distillation time, and low efficiency, and tends to cause loss of heat-sensitive active ingredients in materials.

Patent Publication No. CN101721831B discloses a differential-pressure solid-state continuous distillation process, which adopts three-step treatment of preheating, intensive distillation, and residual distillation, but is mainly applicable to the separation of alcohol. It cannot control the moisture and temperature of the distilled material, so it is not suitable for the distillation of materials containing heat-sensitive ingredients, and it is not favorable to the subsequent solvent extraction of the distilled material.

At present, the demand for volatile essential oils on the market is increasing, and there is an urgent need for a cost-effective and efficient method for continuous steam distillation of essential oils, which is suitable for large-scale industrial production.

SUMMARY OF THE INVENTION

The technical problem to be solved by the present invention is to provide a continuous distillation process, which has a large processing capacity, a high yield of essential oils, and the capability of utilizing waste heat, and is particularly suitable for the distillation of heat-sensitive materials.

To solve the above technical problem, the technical solutions adopted by the present invention are as follows:

A continuous distillation process comprises the following steps: putting a material into a multilayer distillation tower, and allowing the material to sequentially undergo preheating, pressing and pricking, steam distillation, meal roasting, drying, and cooling treatment to give essential oil-containing steam; and condensing the essential oil-containing steam, and carrying out water separation, so as to obtain an essential oil.

Further improvement of the technical solution of the present invention lies in that, the material is subjected to pressing and pricking treatment during the transfer from a preheating section to a steam distillation section.

Further improvement of the technical solution of the present invention lies in that, the water for generating the steam used in the steam distillation is subjected to deoxygenation treatment, and the oxygen content is reduced to 0.2 mg/L or less.

Further improvement of the technical solution of the present invention lies in that, the preheating and meal roasting are both carried out under a condition of introducing nitrogen gas, the drying is performed using hot nitrogen gas, and the essential oil-containing steam passes through an air heat exchanger to serve as a heat source for hot nitrogen gas.

Further improvement of the technical solution of the present invention lies in that, the essential oil-containing steam is subjected to two-stage condensation and water separation to obtain an essential oil, the temperature of the first stage condensation is 20° C. to 30° C., and the temperature of the second stage condensation is −10° C. to 5° C.

Further improvement of the technical solution of the present invention lies in that, the preheating adopts indirect heating with steam under a pressure of 0.1 to 0.2 MPa; the steam distillation adopts direct heating with steam under a pressure of 0.01 to 0.05 MPa; the meal roasting adopts indirect heating with steam under a pressure of 0.1 to 0.4 MPa; the temperature of the hot nitrogen gas drying is 40 to 80° C. and the pressure is 10 to 40 KPa; and cooling is carried out at a cold air cooling section using air at room temperature under a pressure of 10 to 40 KPa.

Preferably, the treatment object of the present invention is a material containing a large amount of volatile essential oil, and more preferably prickly ash, pepper, *eucalyptus* leaves, cinnamon leaves, or fir.

Further improvement of the technical solution of the present invention lies in that, the multilayer distillation tower comprises a tower body with a rotating shaft at the center, the tower body comprises a column body, an upper head and a support, and is divided into a preheating section, a distillation section, a meal roasting section, a drying section and a cooling section by trays in sequence from top to bottom along the tower body, the upper end of the tower body is provided with a feed port connected to the preheating section, the lower end of the tower body is provided with a discharge port connected to the cooling section, each tray is provided with a discharge auger that connects the upper and lower spaces, the lower ends of the trays in the preheating section and the meal roasting section are provided with conduits which contact with the lower surface of the tray to realize indirect heat transfer of steam, the trays in the distillation section, the drying section and the cooling section are sandwich trays, the side of the sandwich tray is provided with a gas inlet and the upper surface thereof is provided with a gas outlet, the internal gas in the preheating section, the distillation section, the meal roasting section and the drying section are connected to a collector through a pipeline, and the rotating shaft is provided with a scimitar which rotates along with the rotating shaft to play a role of dispersing and billowing materials.

Further improvement of the technical solution of the present invention lies in that, the drying section and the meal roasting section are connected through a pipeline, the meal roasting section and the preheating section are connected through a pipeline, the hot nitrogen gas first enters the drying section from the gas inlet on the side of the sandwich tray of the drying section, then passes through the meal roasting section, finally enters the preheating section, and is finally discharged from the top of the distillation tower to enter the collector, and the essential oil is recovered by two-stage condensation.

Further improvement of the technical solution of the present invention lies in that, the front end of the discharge auger from the preheating section to the distillation section is equipped with a roller machine having a pair of rollers with pointed cones, and the roller machine performs pressing pricking treatment on materials.

Further improvement of the technical solution of the present invention lies in that, the multilayer distillation tower is configured to 6 to 9 layers, wherein the preheating section is configured to 1 layer, the steam distillation section is provided with 2 to 4 layers of trays, the meal roasting section is configured to 1 layer, the hot nitrogen gas drying section is configured to 1 to 2 layers, and the cooling section is configured to 1 layer.

Another purpose of the present invention is to protect a multi-section distillation device, the structure of which is as follows: the multilayer distillation tower comprises a tower body with a rotating shaft at the center; the tower body comprises a column body, an upper head and a support, and is divided into a preheating section, a distillation section, a meal roasting section, a drying section and a cooling section by trays in sequence from top to bottom along the tower body, the upper end of the tower body is provided with a feed port connected to the preheating section, the lower end of the tower body is provided with a discharge port connected to the cooling section, each tray is provided with a discharge auger that connects the upper and lower spaces, the lower ends of the trays in the preheating section and the meal roasting section are provided with conduits which contact with the lower surface of the tray to realize indirect heat transfer of steam, the trays in the distillation section, the drying section and the cooling section are sandwich trays, the side of the sandwich tray is provided with a gas inlet, and the upper surface thereof is provided with a gas outlet, the internal gas in the preheating section, the distillation section, the meal roasting section and the drying section are connected to a collector through a pipeline, and the rotating shaft is provided with a scimitar which rotates along with the rotating shaft to play a role of dispersing and billowing materials.

Further improvement of the technical solution of the present invention lies in that, the drying section and the meal roasting section are connected through a pipeline, the meal roasting section and the preheating section are connected through a pipeline, the hot nitrogen gas first enters the drying section from the gas inlet on the side of the sandwich tray of the drying section, then passes through the meal roasting section, finally enters the preheating section, and is finally discharged from the top of the distillation tower to enter the collector, and the essential oil is recovered by two-stage condensation.

Further improvement of the technical solution of the present invention lies in that, the front end of the discharge auger (8) from the preheating section to the distillation section is equipped with a roller machine having a pair of rollers with pointed cones, and the roller machine performs pressing and pricking treatment on materials.

Further improvement of the technical solution of the present invention lies in that, the multilayer distillation tower is configured to 6 to 9 layers, wherein the preheating section is configured to 1 layer, the steam distillation section is provided with 2 to 4 layers of trays, the meal roasting section is configured to 1 layer, the hot nitrogen gas drying section is configured to 1 to 2 layers, and the cooling section is configured to 1 layer.

Due to the adoption of the above technical solution, the present invention achieves the following the technical progresses:

The present invention adopts a continuous distillation process, the distillation time is short, and all the steps are performed in a multilayer distillation tower in closed manner, thereby avoiding the loss of essential oil-containing steam and achieving the effects of high efficiency and high yield.

The yield of essential oil in the present process is high, and it can reach 98% or more. By adopting preheating, pressing and pricking, multi-stage distillation, and meal roasting process, the distillation effect is good. The material is subjected to pressing and pricking in the tower so as to improve the distillation effect and avoid the problem of essential oil leakage existing in the pretreatment carried out outside the tower, and the essential oil produced in preheating and meal roasting can also be recovered. Moreover, the step of pressing and pricking is set after the preheating section to ensure that pressing and pricking can play better effect. Meanwhile, the sealing of the equipment is strengthened to reduce the leakage loss of essential oil caused by untight sealing. Air-locked valves are installed to seal the feed port and the discharge port to reduce the outflow of essential oil. The material is conveyed through the discharge auger between layers, to achieve better sealing effect and reduce the loss of essential oil due to spilling to other layers. After distillation, the essential oil is recovered by two-stage condensation performed at room temperature and low temperature respectively, so as to reduce the content of essential oil in the exhaust gas.

The present process is suitable for the treatment of heat-sensitive materials. numb-taste components in prickly ash and piperine in pepper and the like are easily lost under high temperature conditions. The water for generating steam is firstly subjected to deoxygenation treatment so as to greatly reduce the oxygen content in the steam, thereby reducing the oxidation loss during distillation. Other high-temperature treatment processes are also carried out under nitrogen gas protection, thereby significantly reducing the loss of heat-sensitive components.

In the present process, after distillation, the material is sequentially subjected to meal roasting, drying and cooling to facilitate the subsequent processing of the distilled material. In addition to essential oils, prickly ash, pepper, *eucalyptus* leaves, cinnamon leaves, fir and the like contain other flavor and aroma substances. The steam-distilled material needs to be further treated by solvent extraction or supercritical extraction. In the conventional distillation process, the material will contain a large amount of water after steam distillation, which will greatly affect the subsequent extraction. In the present process, the drying process is added after distillation, so that the moisture in the material after distillation is effectively controlled, and subsequent extraction can be directly performed.

In the present process, the steam used in distillation is further used as the heat source of hot air, so that the waste heat of steam can be utilized and energy can be saved.

The present process uses a multilayer distillation tower to achieve continuous automated production, thereby greatly improving production efficiency and reducing production costs.

Figure 1:
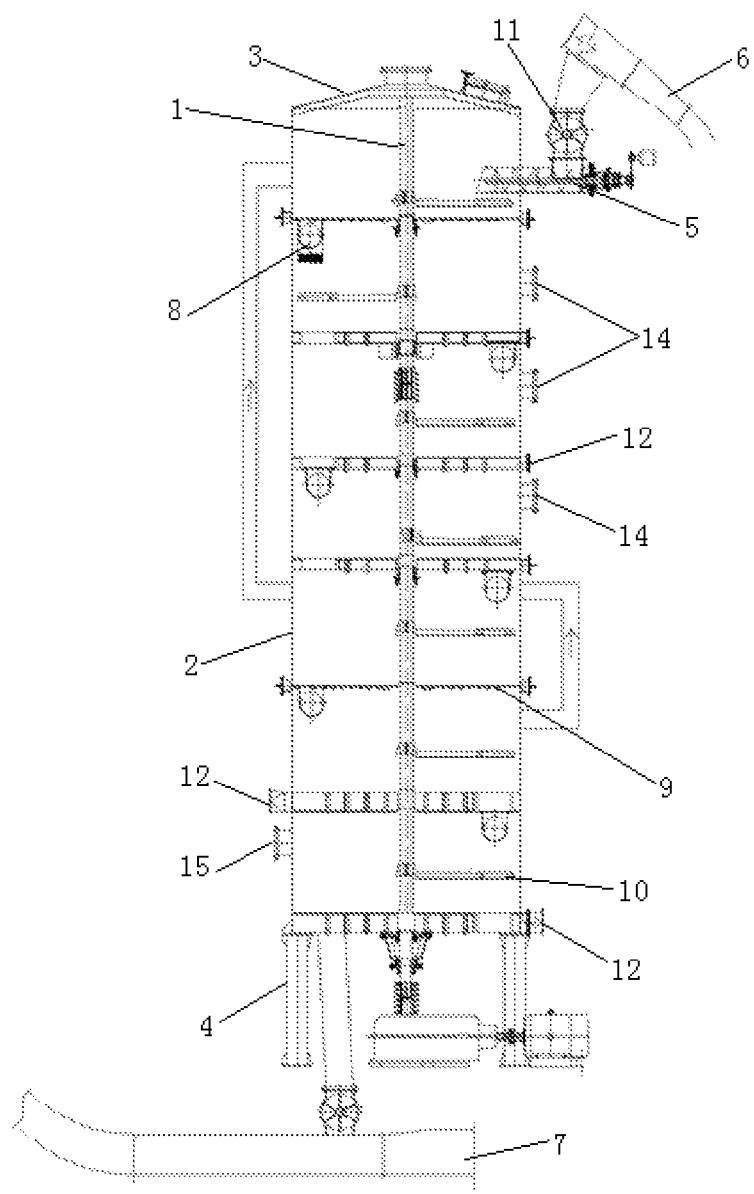
FIG. 1 is a schematic structural diagram of a multilayer distillation tower.

wherein, 1: rotating shaft, 2: column body, 3: upper head, 4: support, 5: feeding auger, 6: feeding scraper conveyor, 7: discharge scraper conveyor, 8: discharge auger, 9: conduit, 10: scimitar, 11: air-locked valve, 12: gas inlet, 13: gas outlet, 14: steam outlet, 15: exhaust port.

SPECIFIC MODES FOR CARRYING OUT THE EMBODIMENTS

The present invention will be described in further detail in combination with the Examples below:

A continuous distillation process specifically comprises the following steps: putting a material into a multilayer distillation tower, and allowing the material to sequentially undergo preheating, pressing and pricking, steam distillation, meal roasting, drying, and cooling treatment to give essential oil-containing steam; and condensing the essential oil-containing steam, and carrying out water separation, so as to obtain an essential oil.

The material is subjected to pressing and pricking treatment during the transfer from a preheating section to a steam distillation section, so as to improve the distillation effect and avoid the problem of volatilization and leakage of essential oil existing in the pretreatment performed outside the tower.

The water for generating steam used in the steam distillation is subjected to deoxygenation treatment, and the oxygen content is reduced to 0.2 mg/L or less. The deoxygenation method of the water for generating steam is any of vacuum deoxygenation, thermal deoxygenation, and chemical deoxygenation.

The preheating and meal roasting are both carried out under a condition of introducing nitrogen gas, the drying is performed using hot nitrogen gas, the purity of the nitrogen gas is not less than 99%, and the essential oil-containing steam passes through an air heat exchanger to serve as a heat source for hot nitrogen gas.

The preheating adopts indirect heating with steam under a pressure of 0.1 to 0.2 MPa; the steam distillation adopts direct heating with steam under a pressure of 0.01 to 0.05 MPa; the meal roasting adopts indirect heating with steam under a pressure of 0.1 to 0.4 MPa; the temperature of the hot nitrogen gas drying is 40 to 80° C. and the pressure is 10 to 40 KPa; and a cold air cooling section uses air at room temperature under a pressure of 10 to 40 KPa. The height of the material layer in the distillation section is controlled to be one-third to two-thirds of the height of the tray, and the residence time of the material in the distillation tower is 1 to 3 hours.

The essential oil-containing steam is subjected to two-stage condensation and water separation to obtain an essential oil, the temperature of the first stage condensation is 20° C. to 30° C., and the temperature of the second stage condensation is −10° C. to 5° C.

The multilayer distillation tower is configured to 6 to 9 layers, wherein the preheating section is configured to 1 layer, the steam distillation section is provided with 2 to 4 layers of trays, the meal roasting section is configured to 1 layer, the hot nitrogen gas drying section is configured to 1 to 2 layers, and the cooling section is configured to 1 layer.

Figure 2:
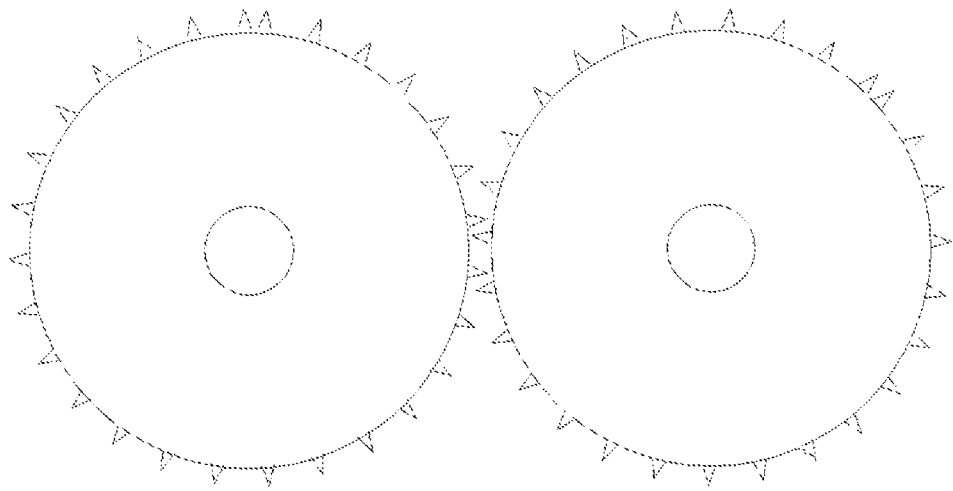
FIG. 2 is a structural schematic diagram of a roller machine having a pair of rollers.
Figure 3:
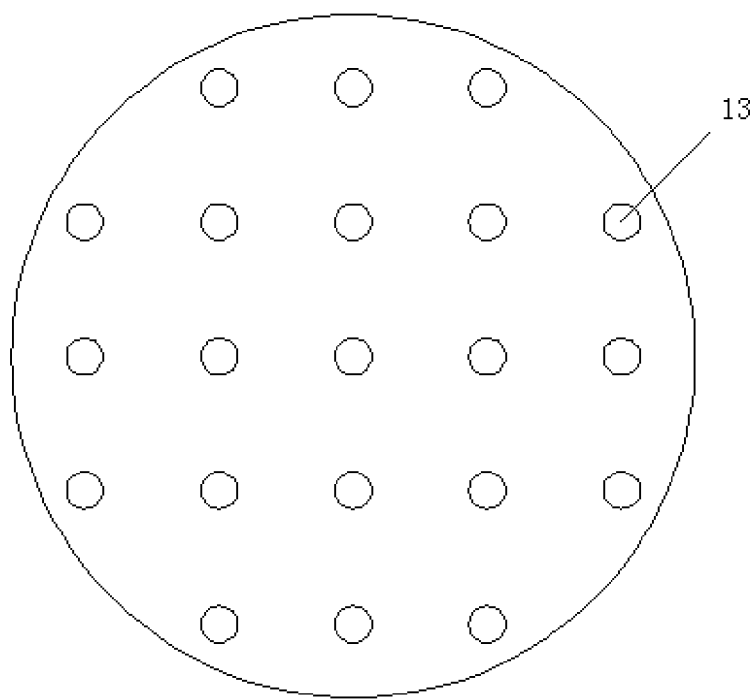
FIG. 3 is a schematic diagram of an upper surface of a sandwich tray.
Figure 4:
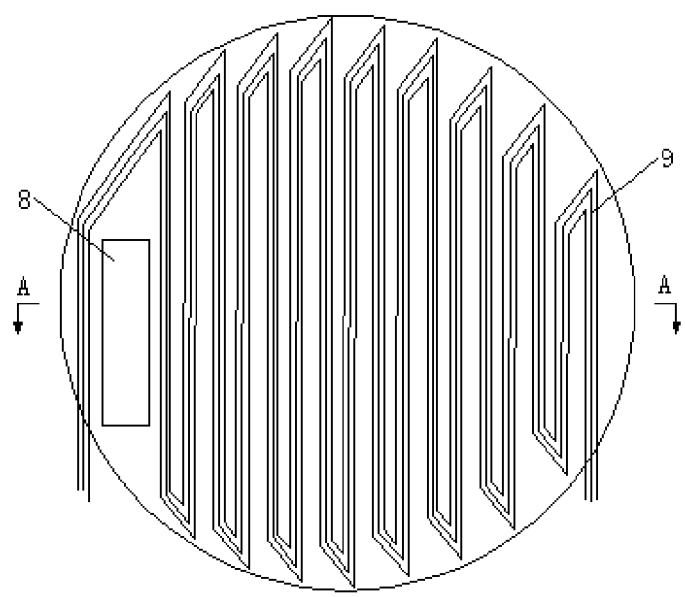
FIG. 4 is a structural schematic diagram of a conduit.
Figure 5:
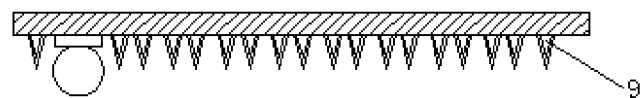
FIG. 5 is a top view of FIG. 4.

As shown in FIGS. 1 to 5, the specific structure of the multilayer distillation tower is as follows: the multilayer distillation tower comprises a tower body, a rotating shaft 1 is provided at the center of the tower body, the rotating shaft 1 is provided with scimitars which rotate along with the rotating shaft 1 to play a role of dispersing and billowing materials, and the scimitars 10 are provided between the trays. The tower body comprises a column body 2, an upper head 3 and a support 4, and is divided into a preheating section, a distillation section, a meal roasting section, a drying section and a cooling section by trays in sequence from top to bottom along the tower body. The upper end of the tower body is provided with a feed port connected to the preheating section. The feed port at the upper end of the tower body is connected to a feeding scraper conveyor 6 through a feeding auger 5 and an air-locked valve 11 is provided between the feeding auger 5 and the feeding scraper conveyor 6. The lower end of the tower body is provided with a discharge port connected to the cooling section, the lower end of the discharge port at the lower end of the tower body is connected to a discharge scraper conveyor 7, and each tray is provided with a discharge auger 8 that connects the upper and lower spaces.

The lower ends of the trays in the preheating section and the meal roasting section are provided with conduits 9 which contact with the lower surface of the tray to realize indirect heat transfer of steam. The cross-section of the conduit 9 at the lower surface of the tray in the preheating section and the meal roasting section is an inverted triangle. The conduit 9 is repeatedly bent to cover the lower surface of the tray, that is, the conduit 9 extends from a point on the circumference of the lower surface of the tray to another point on the circumference, then folds back, and the fold-back conduit 9 is arranged in parallel with the preceding segment of conduit, so as to be repeatedly bent to finally cover the lower surface of the tray. The inlet of the conduit 9 at the lower surface of the tray in the preheating section and the meal roasting section is connected with a steam pipeline, and the outlet thereof is connected with a steam condensed water storage tank.

The trays of the distillation section, the drying section and the cooling section are sandwich trays, the side of the sandwich tray is provided with a gas inlet 12 and the upper surface thereof is provided with gas outlets 13. The gas inlet 12 of the distillation section is connected to a steam pipeline. A steam outlet 14 is provided on the side wall of the distillation section, and the steam outlet 14 is connected to a collector. The gas inlet 12 of the sandwich tray of the drying section is connected to a blower through a nitrogen gas conveying pipe, wherein the essential oil-containing steam passes through an air heat exchanger to serve as a heat source for hot nitrogen gas, and when the heat cannot meet the requirements, a heat exchanger is provided on a hot air conveying pipe to continue heating the nitrogen gas so as to meet the requirements. The drying section and the meal roasting section are connected through a pipeline. The meal roasting section and the preheating section are connected through a pipeline. Hot nitrogen gas first enters the drying section from the gas inlet 12 on the side of the sandwich tray of the drying section, then passes through the meal roasting section, finally enters the preheating section, and is finally discharged from the top of the distillation tower to enter a collector, and the essential oil is recovered by two-stage condensation. The collector comprises a dry trap, a condenser, and a liquid collecting tank connected in sequence. Cold air is introduced via the gas inlet 12 of the sandwich tray of the cooling section, and the cold air enters the cooling section through the gas outlet 13. An exhaust port 15 is provided on the side wall of the cooling section. The exhaust port 15 is connected with a cyclone separator and a purifier to communicate with the outside air.

The front end of the discharge auger 8 from the preheating section to the distillation section is equipped with a roller machine with pointed cones. The roller machine comprises two rollers, the peripheral surface of which are against each other, and the pointed cones are provided on the rollers. The roller machine performs pressing and pricking treatment on materials.

Example 1

500 kg of prickly ash with essential oil content of 6.5% was taken and subjected to the following steps: preheating in a single-layer preheating section with a steam pressure of 0.1 MPa; distillation in a double-layer steam distillation section with the steam pressures in the two layers being 0.01 Mpa and 0.02 Mpa, respectively; meal roasting in a single-layer meal roasting section with a steam pressure of 0.1 MPa; drying in a single-layer hot nitrogen gas drying section with a temperature of 40° C. and a pressure of 10 KPa; and treating in a single-layer cold air section to give essential oil-containing steam. Then the essential oil-containing steam was subjected to two-stage condensation with a first stage condensation temperature of 30° C. and a second stage condensation temperature of 5° C. A total of 31.85 L of essential oil was obtained, and the yield of essential oil was 98.0%.

Example 2

800 kg of pepper with essential oil content of 5.0% was taken and subjected to the following steps: preheating in a single-layer preheating section with a steam pressure of 0.2 MPa; distillation in a four-layer steam distillation section with the steam pressures in the four layers being 0.01 MPa, 0.02 MPa, 0.04 MPa, and 0.05 MPa, respectively; meal roasting in a single-layer meal roasting section with a steam pressure of 0.4 MPa; drying in a double-layer hot nitrogen gas drying section with temperatures in two layers being 60° C. and 80° C., and pressures being 20 KPa and 40 KPa, respectively; and treating in a single-layer cold air section to give essential oil-containing steam. Then the essential oil-containing steam was subjected to two-stage condensation with a first stage condensation temperature of 20° C. and a second stage condensation temperature of −10° C. A total of 39.80 L of essential oil was obtained, and the yield of essential oil was 99.5%.

Example 3

400 kg of prickly ash with essential oil content of 12.5% was taken and subjected to the following steps: preheating in a single-layer preheating section with a steam pressure of 0.15 MPa; distillation in a three-layer steam distillation section with the steam pressures in three layers being 0.01 MPa, 0.03 MPa and 0.04 MPa, respectively; meal roasting in a single-layer meal roasting section with a steam pressure of 0.3 MPa; drying in a single-layer hot nitrogen gas drying section with a temperature of 60° C. and a pressure of 30 KPa; and treating in a single-layer cold air section to give essential oil-containing steam. Then the essential oil-containing steam was subjected to two-stage condensation with a first stage condensation temperature of 25° C. and a second stage condensation temperature of 0° C. A total of 49.55 L of essential oil was obtained, and the yield of essential oil was 99.1%.

INDUSTRIAL APPLICABILITY

The present invention discloses a continuous distillation process, which belongs to a method for producing a volatile essential oil. The process comprises the following steps: putting a material into a multilayer distillation tower, and allowing the material to sequentially undergo preheating, pressing and pricking, steam distillation, meal roasting, drying, and cooling treatment to give essential oil-containing steam; and condensing the essential oil-containing steam, and carrying out water separation, so as to obtain an essential oil. The present invention has large processing capacity, high yield of essential oil, and utilization of waste heat, and is particularly suitable for distillation of heat-sensitive materials.

What is claimed is:
1. A continuous distillation process, comprising the following steps:
putting a material into a multilayer distillation tower comprising a tower body with a rotating shaft at the center, the tower body comprising a column body, an upper head and a support, the rotating shaft being provided with a scimitar which rotates along the rotating shaft to disperse and billow materials;
sequentially performing on the material steps of:
preheating,
pressing and pricking,
steam distillation,
meal roasting,
drying, and
cooling to give an essential oil-containing steam;
condensing the essential oil-containing steam to provide condensed essential oil-containing steam; and
separating water from the condensed essential oil-containing steam to obtain an essential oil,
wherein the tower body is divided into:
a preheating section,
a distillation section,
a meal roasting section,
a drying section, and
a cooling section,
by trays in sequence from top to bottom along the tower body,
an upper end of the tower body is provided with a feed port connected to the preheating section,
a lower end of the tower body is provided with a discharge port connected to the cooling section,
each tray is provided with a discharge auger that connects an upper space and a lower space of each tray,
lower ends of the trays in the preheating section and the meal roasting section are provided with conduits which contact with a lower surface of the trays resulting in indirect heat transfer of steam,
the trays in the distillation section, the drying section and the cooling section are sandwich trays,
a side of each of the sandwich trays is provided with a gas inlet, and an upper surface of each sandwich tray is provided with a gas outlet,
the preheating section, the distillation section, the meal roasting section and the drying section are connected to a collector through a first pipeline for carrying internal gas,
a front end of the discharge auger from the preheating section to the distillation section is equipped with a roller machine having a pair of rollers with pointed cones, and the roller machine performs pressing and pricking treatment on materials,
the drying section and the meal roasting section are connected through a second pipeline,
the meal roasting section and the preheating section are connected through a third pipeline, the hot nitrogen gas first enters the drying section from the gas inlet on the side of the sandwich tray of the drying section, then passes through the meal roasting section, enters the preheating section, and is discharged from a top of the distillation tower to enter the collector, and the essential oil is recovered by two-stage condensation.

2. The continuous distillation process according to claim 1, wherein the material is subjected to pressing and pricking treatment during transfer from the preheating section to the steam distillation section.

3. The continuous distillation process according to claim 1, wherein water for generating steam used in the steam distillation is subjected to deoxygenation treatment, and an oxygen content of the water is reduced to 0.2 mg/L or less.

4. The continuous distillation process according to claim 1, wherein the preheating and meal roasting are both carried out under a condition of introducing nitrogen gas,
the drying is performed using hot nitrogen gas, and
the essential oil-containing steam passes through an air heat exchanger to serve as a heat source for the hot nitrogen gas.

5. The continuous distillation process according to claim 1, wherein the essential oil-containing steam is subjected to two-stage condensation and water separation to obtain the essential oil, a temperature of the first stage condensation is 20° C. to 30° C., and a temperature of the second stage condensation is −10° C. to 5° C.

6. The continuous distillation process according to claim 1, wherein the preheating comprises indirect heating with steam under a pressure of 0.1 to 0.2 MPa;
the steam distillation comprises direct heating with steam under a pressure of 0.01 to 0.05 MPa;
the meal roasting comprises indirect heating with steam under a pressure of 0.1 to 0.4 MPa;
the drying is carried out using hot nitrogen gas at a temperature of 40 to 80° C. under a pressure of 10 to 40 KPa; and
the cooling is carried out with cold air in the cooling section using air at room temperature under a pressure of 10 to 40 KPa.

7. The continuous distillation process according to claim 1, wherein the multilayer distillation tower is configured to comprise 6 to 9 layers of the trays,
the preheating section is configured to comprise 1 layer of the trays,
the steam distillation section is provided with 2 to 4 layers of the trays,
the meal roasting section is configured to comprise 1 layer of the trays,
the hot nitrogen gas drying section is configured to comprise 1 to 2 layers of the trays, and
the cooling section is configured to comprise 1 layer of the trays.

* * * * *